United States Patent
Lee et al.

(10) Patent No.: US 12,478,464 B2
(45) Date of Patent: Nov. 25, 2025

(54) ADJUSTABLE OPTICAL SYSTEM FOR INTRAOCULAR MICRO-DISPLAY

(71) Applicant: Verily Life Sciences LLC, Dallas, TX (US)

(72) Inventors: Shungneng Lee, Sunnyvale, CA (US); Supriyo Sinha, Menlo Park, CA (US); Dimitri Azar, Chicago, IL (US)

(73) Assignee: Verily Life Sciences LLC, Dallas, TX (US)

( * ) Notice: Subject to any disclaimer, the term of this patent is extended or adjusted under 35 U.S.C. 154(b) by 1051 days.

(21) Appl. No.: 17/609,753

(22) PCT Filed: Mar. 23, 2020

(86) PCT No.: PCT/US2020/024201
§ 371 (c)(1),
(2) Date: Nov. 8, 2021

(87) PCT Pub. No.: WO2020/231518
PCT Pub. Date: Nov. 19, 2020

(65) Prior Publication Data
US 2022/0252849 A1    Aug. 11, 2022

Related U.S. Application Data

(60) Provisional application No. 62/907,848, filed on Sep. 30, 2019, provisional application No. 62/846,443, filed on May 10, 2019.

(51) Int. Cl.
*A61F 2/16*    (2006.01)
*A61F 9/08*    (2006.01)
(Continued)

(52) U.S. Cl.
CPC .......... *A61F 2/1624* (2013.01); *A61F 2/1613* (2013.01); *A61F 2/1618* (2013.01);
(Continued)

(58) Field of Classification Search
CPC .. A61F 2/1624; A61F 2/16–2002; A61F 9/08; G02C 7/085; G02B 26/005; G02B 2207/115; G02B 26/0883
See application file for complete search history.

(56) References Cited

U.S. PATENT DOCUMENTS 7,496,174 B2    2/2009    Gertner et al.
8,945,197 B1    2/2015    Friend et al.
(Continued)

FOREIGN PATENT DOCUMENTS

CN    108108022    6/2018
EP    1585462    2/2017
(Continued)

OTHER PUBLICATIONS

Non-Final Office Action received for U.S. Appl. No. 17/609,752, mailed on Apr. 19, 2023, 17 pages.
(Continued)

*Primary Examiner* — Rebecca S Preston
(74) *Attorney, Agent, or Firm* — Haynes and Boone, LLP

(57) ABSTRACT

An intraocular micro-display (IOMD) implant includes an enclosure shaped for implantation into an eye, a micro-display, a base lens, and an adjustable lens. The micro-display is disposed in the enclosure and oriented to emit an image towards a retina of the eye. The base lens has a fixed optical power, is attached to the enclosure, and is positioned relative to the micro-display to reside in an optical path extending between the micro-display and the retina. The base lens is configured to apply the fixed optical power to the image. The adjustable lens is disposed in the optical path between the micro-display and the retina. The adjustable lens has an adjustable optical power that is adjustable in-situ
(Continued)

to adjust a focal distance of the image projected by the IOMD implant after the IOMD implant has been implanted into the eye.

19 Claims, 9 Drawing Sheets

(51) Int. Cl.
| | |
|---|---|
| G02B 3/00 | (2006.01) |
| G02B 7/08 | (2021.01) |
| G02B 13/00 | (2006.01) |
| G02B 13/24 | (2006.01) |
| G02B 26/00 | (2006.01) |
| G02B 26/08 | (2006.01) |
| H04N 7/18 | (2006.01) |
| G02B 27/01 | (2006.01) |

(52) U.S. Cl.
CPC ............ *A61F 2/1648* (2013.01); *A61F 9/08* (2013.01); *G02B 3/0037* (2013.01); *G02B 7/08* (2013.01); *G02B 13/0065* (2013.01); *G02B 13/24* (2013.01); *G02B 26/005* (2013.01); *G02B 26/0883* (2013.01); *H04N 7/18* (2013.01); *A61F 2/16015* (2015.04); *G02B 2027/0138* (2013.01); *G02B 27/017* (2013.01); *G02B 2207/115* (2013.01)

(56) References Cited

U.S. PATENT DOCUMENTS

| | | | |
|---|---|---|---|
| 9,042,028 | B2 | 5/2015 | Choi et al. |
| 9,791,700 | B2 | 10/2017 | Schowengerdt |
| 9,997,585 | B2 | 6/2018 | Kasai |
| 10,025,379 | B2 | 7/2018 | Drake et al. |
| 10,251,780 | B2 | 4/2019 | Tai et al. |
| 10,386,655 | B2 | 8/2019 | Lee et al. |
| 11,874,462 | B2 | 1/2024 | Lee et al. |
| 2004/0117011 | A1* | 6/2004 | Aharoni ............ A61F 2/14 623/4.1 |
| 2011/0169998 | A1 | 7/2011 | Canetti |
| 2012/0127062 | A1 | 5/2012 | Bar-Zeev et al. |
| 2015/0003819 | A1 | 1/2015 | Ackerman et al. |
| 2015/0109191 | A1 | 4/2015 | Johnson et al. |
| 2016/0025971 | A1 | 1/2016 | Crow et al. |
| 2016/0029883 | A1 | 2/2016 | Cox |
| 2016/0050345 | A1 | 2/2016 | Longbotham et al. |
| 2016/0313798 | A1 | 10/2016 | Connor |
| 2017/0330042 | A1 | 11/2017 | Vaziri |
| 2017/0333181 | A1* | 11/2017 | Curatu ............... A61F 2/1648 |
| 2017/0336641 | A1 | 11/2017 | von und zu Liechtenstein |
| 2018/0120936 | A1 | 5/2018 | Keller et al. |
| 2018/0144196 | A1 | 5/2018 | Vaziri |
| 2018/0249072 | A1 | 8/2018 | Li |
| 2018/0256316 | A1 | 9/2018 | Deering et al. |
| 2019/0025688 | A1 | 1/2019 | Maynard |
| 2019/0109536 | A1 | 4/2019 | Lee |
| 2020/0197223 | A1 | 6/2020 | Yu et al. |

FOREIGN PATENT DOCUMENTS

| | | |
|---|---|---|
| EP | 1996968 | 3/2017 |
| GB | 2482076 | 1/2012 |
| WO | 2006015315 | 2/2006 |
| WO | 2008153592 | 12/2008 |
| WO | 2018058155 | 3/2018 |
| WO | 2018222357 | 12/2018 |
| WO | 2019055477 | 3/2019 |

OTHER PUBLICATIONS

Notice of Allowance received for U.S. Appl. No. 17/609,752, mailed on Aug. 31, 2023, 8 pages.

Notice of the Reason for Refusal for Japanese Application No. 2021-566983 mailed Jan. 4, 2023, 9 pages.

Extended European Search Report for European Application No. 20806439.4 mailed Dec. 9, 2023, 16 pages.

International Search Report and Written Opinion for International Application No. PCT/US2020/024195 mailed Jun. 22, 2020, 10 pages.

"Argus II: the life-changing retinitis pigmentosa treatment," SecondSight, retrieved from the Internet <https://www.secondsigh.com/discover-argus/>, May 20, 2019, 8 pages.

Shim, BS, Sarah Y., et al., "Feasability of Intraocular Projection for Treatment of Intractable Corneal Opacity," Corenea, vol. 38, No. 4, Apr. 2019, pp. 523-527.

International Search Report and Written Opinion for International Application No. PCT/US2020/024201 mailed Jun. 29, 2020, 11 pages.

* cited by examiner

ADJUSTABLE OPTICAL SYSTEM FOR INTRAOCULAR MICRO-DISPLAY

CROSS-REFERENCE TO RELATED APPLICATIONS

This application claims the benefit of U.S. Provisional Application No. 62/907,848, filed Sep. 30, 2019, and U.S. Provisional Application No. 62/846,443, filed May 10, 2019, both of which are hereby incorporated by reference in their entirety.

TECHNICAL FIELD

This disclosure relates generally to ophthalmic devices, and in particular, relates to intraocular micro-displays.

BACKGROUND INFORMATION

Disease or injury to the cornea can lead to opacification or significant optical damage to the cornea, such that the individual is effectively rendered blind. The blindness may occur despite the patient having a fully functioning retina. For these patients with an intact retina but otherwise blind due to vascularization or damage to the cornea, implantation of an intraocular micro-display in the excised lens of the eye (e.g., capsular sack region) can restore image reproduction onto their fully functioning retina, thereby returning vision to the patient.

A proposed solution for an electronic intraocular micro-display involves the use of a transcutaneous tether that couples a wireless transmitter positioned behind the ear to the intraocular micro-display. This tether provides power and data communication to the intraocular micro-display. The transcutaneous nature and complex surgery required for this proposed solution, likely makes this solution prone to physiological compatibility issues and inflammation. Since the tether protrudes outside of the eye and back into subcutaneous flesh on the side of the face, the tether also presents an infection risk.

To avoid the use of a transcutaneous tether, the intraocular micro-display and related circuitry must have a sufficiently compact form factor to fit entirely within the eye in the region of the capsular sack. As such, the electronics and optical sub-systems of such a small intraocular display present significant challenges.

For example, the optical system of the intraocular micro-display must accomplish the difficult task of translating a flat image output from the micro-display onto the concave retinal surface at the back of the eye. The offset distance between the capsular sack region, where the intraocular micro-display is implanted, and the retina is a relatively short throw distance, thus requiring a powerful lensing system (e.g., greater than 50 diopter or even much more). The need for high optical power, even greater than the user's natural crystalline lens, is in part due to the fact that the image output from the intraocular micro-display is emitted from behind the cornea and thus does not benefit from the optical power of the cornea. In addition, the adult human eye typically can image objects that are located no closer than 15 cm away from the natural lens. In the case of an intraocular micro-display, the total available distance between the object (i.e., the micro-display) and the retina is an order of magnitude below this value (~15 mm). Accordingly, the precision of placement of the intraocular micro-display with such a high-power lens is challenging for a surgeon when implanting the device. Additionally, small changes in eye pressure even after a successful implantation can have a deleterious effect on the focus of the image projected onto the retina. The remedial procedure of surgically replacing/repositioning an intraocular micro-display is an invasive solution to be avoided.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
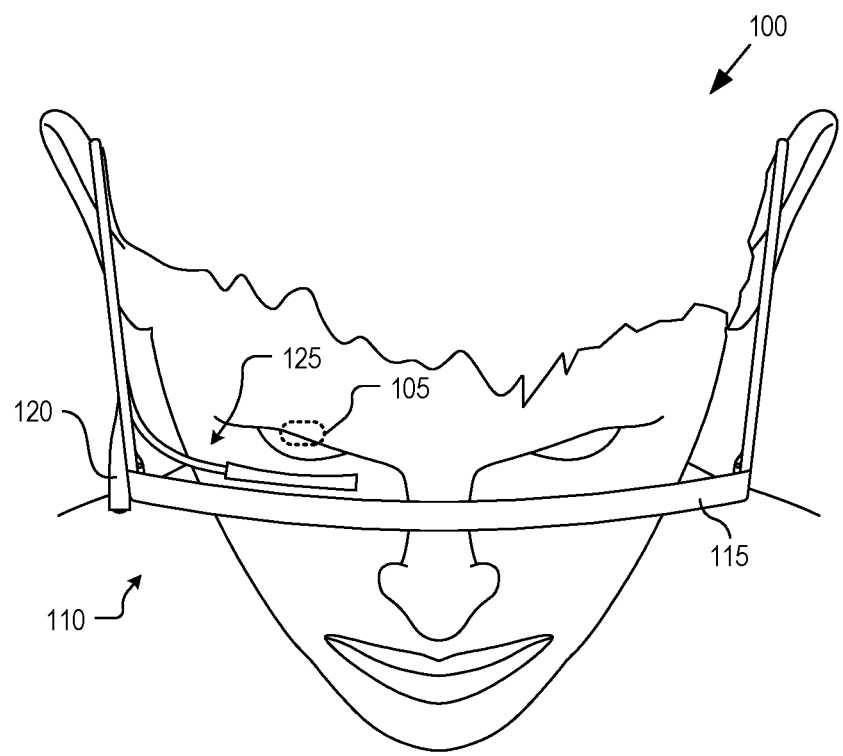
FIGS. 1A and 1B are plan and side view illustrations of an intraocular micro-display (IOMD) system including an IOMD implant and an auxiliary head unit, in accordance with an embodiment of the disclosure.

Embodiments of a system, apparatus, and method of operation for in-situ adjustment of the optical system of an intraocular micro-display to provide dynamic image adjustment/refocusing post implantation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the IOMD system disclosed herein are suitable for patients with intact retinas, yet are blind due to vascularization, occlusion, opacity, or otherwise damage of the cornea. The disclosed IOMD system seeks to restore sight to these patients by implanting an electronic micro-display (referred to as an intraocular micro-display or IOMD) into the eye, such as in the capsular sack region of the eye previously occupied by an excised lens. The IOMD is included within an IOMD implant to project regenerated images onto the patient's fully functioning retina.

Due to the compact nature of the human eye, the lensing power needed to focus the regenerated images projected onto the retina is significant. For example, lensing power of 50-100 diopters, or more, may be needed to bring the projected image into focus on the retina. Compact lenses capable of such high optical power typically have an extremely shallow depth of field. Accordingly, correct surgical placement of the IOMD implant is important for a crisp image and such precise placement can be surgically challenging. Furthermore, as a patient ages, the original placement of the IOMD implant may shift also deleteriously affecting the image clarity.

Accordingly, embodiments disclosed herein include a high-power base lens along with a lower power adjustable lens that facilitates an in-situ, post-surgical placement adjustment to the focal depth. In one embodiment, this adjustment is plus or minus 5 diopters, which relaxes the surgical precision needed in the offset position (z-axis) of the IOMD implant relative to the patient's retina. In some embodiments, the adjustable lens is an electrowetting lens.

In various embodiments, the IOMD implant may further include an adjustable prism that provides beam steering of the projected image in one or two lateral dimensions (e.g., along the x and y axes). The beam steering provides in-situ, post-surgical placement adjustment of the lateral position of the projected image. This relaxes the surgical precision needed in the lateral position (x or y axes) of the IOMD implant relative to the patient's retina. In some embodiments, the adjustable prism includes one or two electrowetting prisms. The combination of the adjustable lens and adjustable beam steering prisms increases a surgeon's margin of error and should reduce the incidence of invasive, surgical, repositioning of the IOMD implant, thereby increasing the surgical success rate.

Figure 1B:
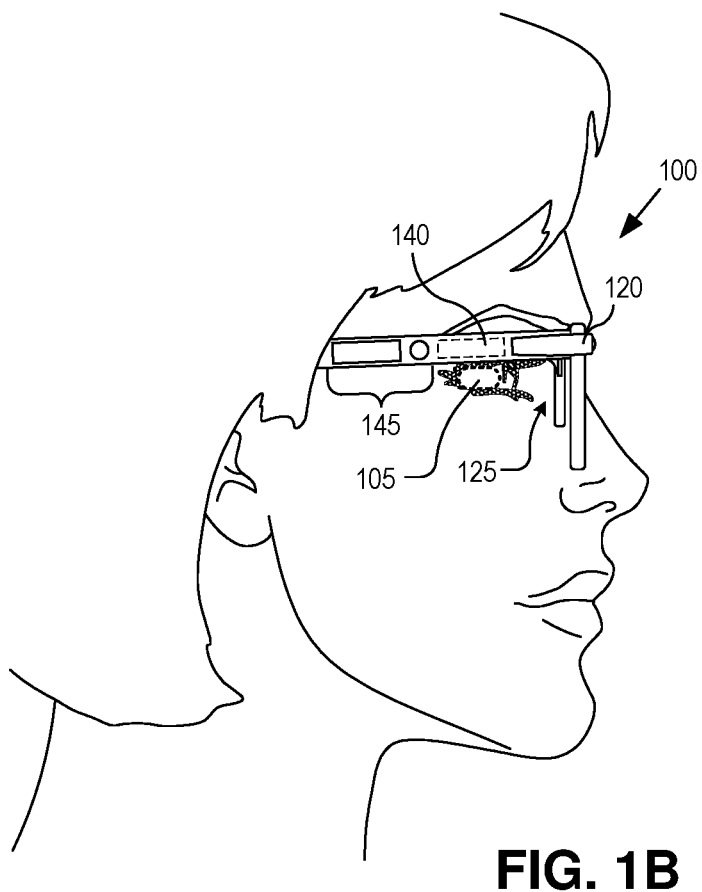
Figure 1C:
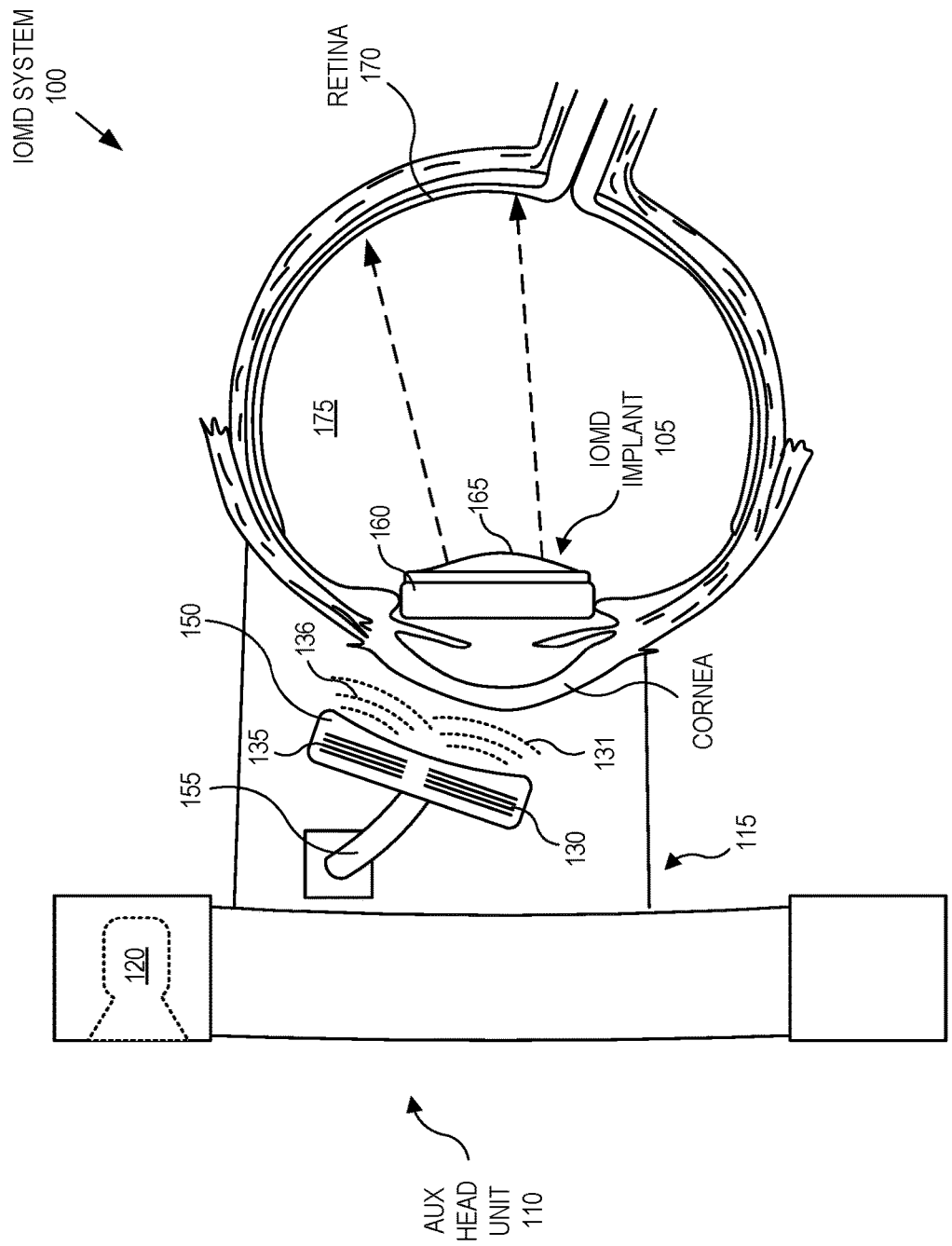
FIG. 1C is a cross-sectional illustration of the IOMD system with the IOMD implant implanted within an eye for projecting images onto a retina, in accordance with an embodiment of the disclosure.

FIGS. 1A, 1B, and 1C illustrate an IOMD system 100 that includes an IOMD implant 105 and an auxiliary head unit 110, in accordance with an embodiment of the disclosure. FIGS. 1A and 1B are plan and side view illustrations, respectively, while FIG. 1C is a cross-sectional illustration of IOMD system 100. The illustrated embodiment of auxiliary head unit 110 includes a frame 115, a camera module 120, an antenna mount 125, a charging antenna 130, a data antenna 135, embedded electronic circuitry 140, and a user interface 145. The illustrated embodiment of antenna mount 125 includes a flexible eye-safe enclosure 150 mounted to frame 115 via an articulating arm 155. The illustrated embodiment of IOMD implant 105 includes an enclosure 160 in which electronics are disposed along with focusing optics 165.

During operation auxiliary head unit 110 inductively powers IOMD implant 105 via power signal 131 output from charging antenna 130. Auxiliary head unit 110 further captures forward facing images with camera module 120 and wirelessly transmits those images to IOMD implant 105 via data signals 136. In one embodiment, this image capture and transmit is executed in real-time. IOMD implant 105 harvests energy from power signal 131, uses that energy to power receiver and controller circuitry for decoding data signals 136 and display circuitry for projecting the image onto retina 170 of eye 175. Again, in one embodiment, the reception, decoding, and display of the image data are executed in real-time and provide the user with virtual, real-time, forward facing vision.

Auxiliary head unit 110 includes frame 115 for mounting auxiliary head unit 110 to the user's head. Although FIGS. 1A-C illustrate frame 115 in the shape of eyeglasses, it should be appreciated that frame 115 may assume a variety of different shapes and configurations for mounting to the user's head including an eyepatch, goggles, a visor, headgear, or otherwise. Camera module 120 is disposed in or on frame 120 and oriented to acquire images in the direction of the user's forward vision. Antenna mount 125 includes an articulating arm 155 to get at least power antenna 130 close to the user's eye 175 for effective wireless charging of IOMD implant 105. As such, antenna mount 125 includes a flexible eye-safe enclosure 150 in which charging antenna 130 is disposed. In the illustrated embodiment, data antenna 135 is also disposed within flexible eye-safe enclosure 150 for close proximity to IOMD implant 105. In other embodiments, data antenna 135 may be disposed elsewhere within frame 115. In yet another embodiment, power antenna 130 and data antenna 135 may be the same physical antenna operated at different frequencies. Eye-safe enclosure 150 may be fabricated of a variety of soft, flexible, dielectric materials, such as molded silicone, etc. Although FIGS. 1A-C illustrate auxiliary head unit 115 as a single contiguous frame, in other embodiments, auxiliary head unit 115 may be segmented into two or more body-wearable modular components that may be interconnected and mounted or worn in various locations about the body or clothing. Furthermore, although FIGS. 1A-C illustrate a monocular IOMD system, the illustrated components may be replicated to implement a binocular IOMD system. Furthermore, IOMD implant 105 may be operated with different external hardware having different functionality than described herein in connection with auxiliary head unit 110. In fact, IOMD implant 105 may be operated without a head mounted auxiliary head unit, but rather receive wireless communications from a variety of sources to display a variety of different information.

As illustrated, IOMD implant 105 is entirely disposed within eye 175 and does not include electronic cables or tethers extending out of eye 175 to auxiliary head unit 110. Similarly, auxiliary head unit 110 is an independent, discrete unit that is worn on the user's head. Auxiliary head unit 110 includes embedded electronics for powering and orchestrating the operation of IOMD system 100 including itself and IOMD implant 105.

Figure 2:
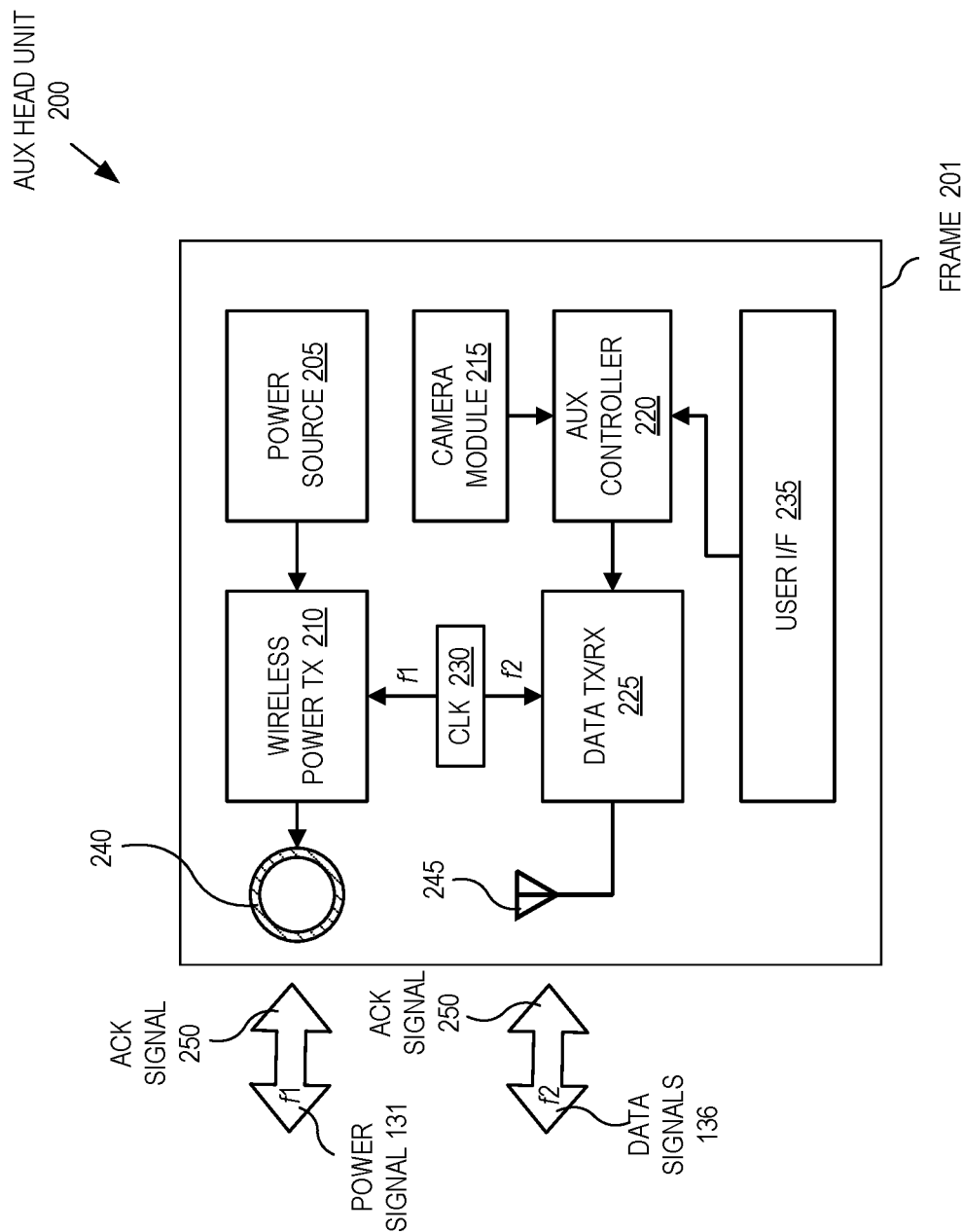
FIG. 2 is a functional block diagram of an auxiliary head unit, in accordance with an embodiment of the disclosure.

FIG. 2 is a functional block diagram of an auxiliary head unit 200, in accordance with an embodiment of the disclosure. Auxiliary head unit 200 is one possible implementation of auxiliary head unit 110. The illustrated embodiment of auxiliary head unit 200 includes a frame 201, a power source 205, a wireless power transmitter 210, a camera module 215, an auxiliary controller 220, a data transceiver 225, a clock 230, a user interface 235, a power antenna 240, and a data antenna 245.

Power source 205 is provided within frame 201 to power the internal electronics of auxiliary head unit 200 and IOMD implant 105 via inductive power transfer. In one embodiment, power source 205 is a rechargeable battery (e.g., lithium ion battery). IOMD implant 105 is inductively charged via wireless power transmitter 210 and power antenna 240. In one embodiment, wireless power transmitter 210 emits power signal 131 as a continuous wave signal having a sufficiently low frequency f1 (e.g., 13.5 MHz, 27 MHz, etc.) for efficient eye-safe power coupling. The frequency of wireless power transmitter 210 may be based upon clock 230. In one embodiment, clock 230 is a high fidelity, low power resonator, such as a quartz crystal oscillator.

Power source 205 also powers camera module 215, auxiliary controller 220, and data transceiver 225. Camera module 215 may include a charged coupled device (CCD) sensor, a complementary metal-oxide-semiconductor (CMOS) sensor, or otherwise that acquires the images relayed to IOMD implant 105. Data transceiver 225 transmits the image data representing the acquired images as data signals 136. Data signals 136 are encoded on a carrier signal having a frequency f2 (e.g., 2.4 GHz). Data transceiver 225 may use any number of encoding techniques including one or more of frequency modulation, phase modulation, amplitude modulation, and/or time multiplexing. Frequency f2 can be higher than frequency f1, since it can be transmitted at lower power for safety and provides a higher bandwidth for transmission of still or video images. In some implementations, the relative frequencies of f1 and f2 can be flipped. In one embodiment, frequency f2 is generated based upon clock 230 as well. For example, frequency f2 may be a multiplied or upscaled version of frequency f7, or frequency f1 may be a divided or downscaled version of frequency f2. In either case, clock signals based upon f1 and f2 may be phase aligned to support synchronous data communications where f2 is regenerated at IOMD implant 105 based upon f1.

Auxiliary controller 220 orchestrates the operation of the other functional components. For example, auxiliary controller 220 may receive and decode an acknowledgment (ACK) signal 250 from IOMD implant 105, and in response, adjust the image data sent to IOMD implant 105 to throttle power consumption of IOMD implant 105. ACK signal 250 may be received as a backscatter modulation of power signal 131 on power antenna 240, or received as an actively transmitted signal over data antenna 245. In either case, ACK signal 250 may operate as an acknowledgement that a given image frame has been received and displayed by the IOMD implant 105. Additionally, ACK signal 131 may also include an indication of reception strength of power signal 131 by IOMD implant 105 and/or an indication of operational temperature of IOMD implant 105. Thus, IOMD implant 105 may use a low bandwidth return channel to transmit acknowledgments along with power readings and temperature readings. The acknowledgments, power readings, and temperature readings may then be used by auxiliary controller 220 to throttle power consumption of IOMD implant 105 by adjusting the frame rate and/or color characteristics of the image data transmitted to IOMD implant 105. By regulating the power consumption of IOMD implant 105, auxiliary controller 220 is also regulating the power consumption of auxiliary head unit 200, which is powering IOMD implant 105. Accordingly, the image data may be adjusted due to power scarcity in one or both of IOMD implant 105 or auxiliary head unit 200.

Auxiliary controller 220 may be implemented with hardware logic (e.g., application specific integrated circuit (ASIC), field programmable gate array (FPGA), etc.), implemented with software/firmware instructions stored in memory and executed by a microprocessor, or a combination of both. User interface 235 may include a variety of physical interfaces to enable the user to interact with IOMD system 100. For example, user interface 235 may include a touchpad to receive gesture commands (e.g., swipe forward, swipe back, tap, double tap, etc.), one or more buttons, dials, switches, knobs, or otherwise. In one embodiment, auxiliary controller 220 may generate visual feedback overlays on the acquired images that are transmitted to IOMD implant 105. These visual feedback overlays may include visual acknowledgments when the user interacts with user interface 235, power readings of power source 205, operational mode selections, temperature readings, a power coupling reading to aid the user in alignment of flexible eye-safe enclosure 150, or otherwise.

Figure 3:
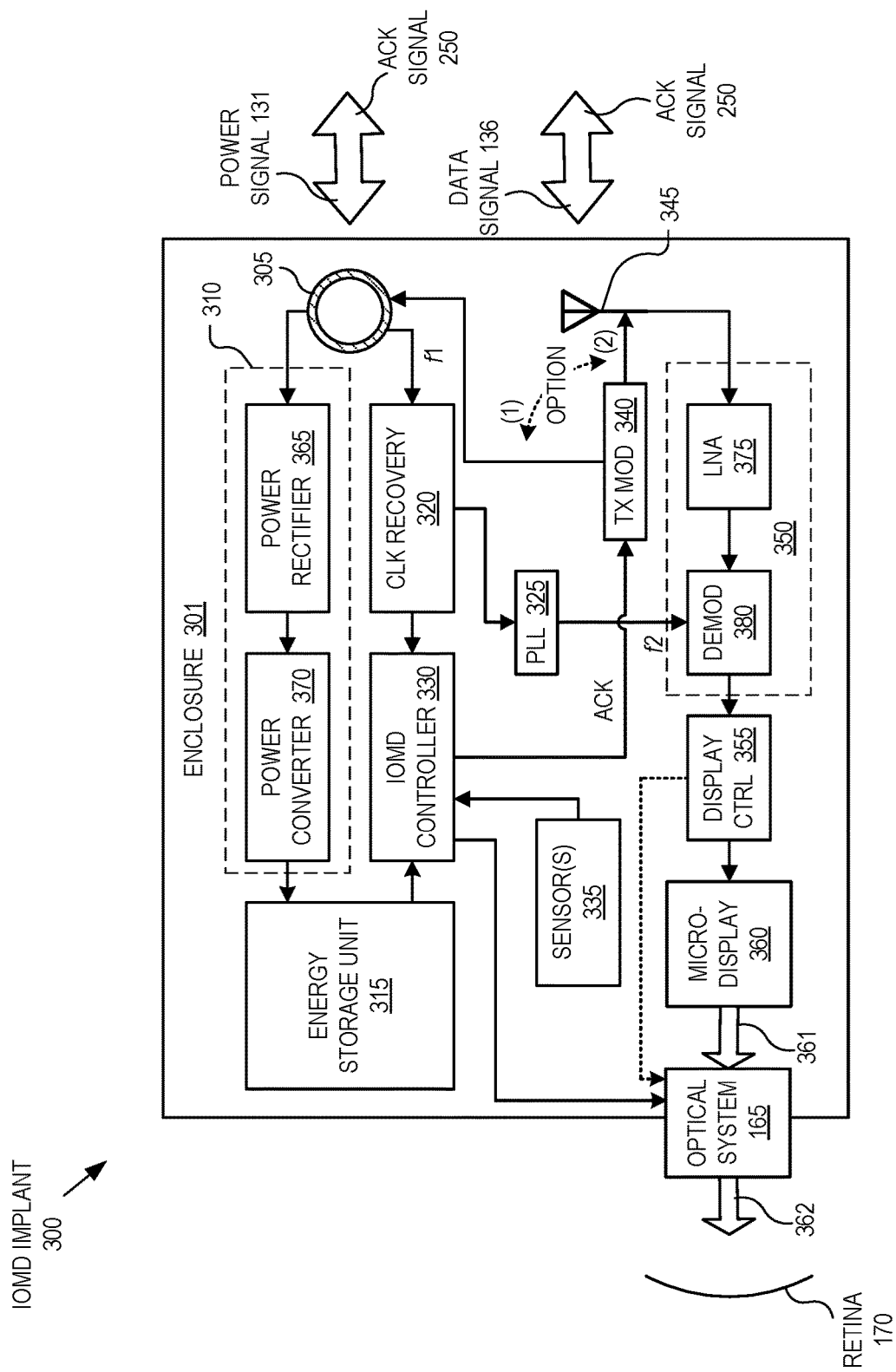
FIG. 3 is a functional block diagram of an IOMD implant, in accordance with an embodiment of the disclosure.

FIG. 3 is a functional block diagram of an IOMD implant 300, in accordance with an embodiment of the disclosure. IOMD implant 300 represents one possible implementation of IOMD implant 105. The illustrated embodiment of IOMD implant 300 includes an enclosure 301, a power antenna 305, power harvesting circuitry 310, an energy storage unit 315, clock recovery circuitry 320, a phase lock loop (PLL) 325, an IOMD controller 330, one or more sensors 335, a transmit module 340, a data antenna 345, receiver circuitry 350, a display controller 355, a micro-display 360, and optics 165. The illustrated embodiment of power harvesting circuitry 310 includes a power rectifier 365 and a power converter 370. The illustrated embodiment of receiver circuitry 350 includes a low noise amplifier (LNA) 375 and a demodulator 380.

In the illustrated embodiment, the electronic components of IOMD implant 300 are housed within a biocompatible enclosure 301 that is sized and shaped for implantation into eye 175. In one embodiment, enclosure 301 is sized for implantation into the region of the capsular sack of eye 175. In one embodiment, enclosure 301 is a hermetically sealed enclosure fabricated of metal, polymers, or otherwise.

During operation, power signal 131 output from auxiliary head unit 110 is incident upon power antenna 305. In various embodiments, power antenna 305 is disposed in or on enclosure 301. In yet other embodiments, power antenna 305 may be externally attached or tethered to enclosure 301, and implanted into another region of eye 175, such as under the sclera. In one embodiment, power antenna 305 is a loop antenna suitable for harvesting inductive power operating at frequency f1. Power harvesting circuitry 310 is coupled to power antenna 305 to harvest the wireless power incident thereon. Power harvesting circuitry 310 includes power rectifier 365 and power converter 370. In one embodiment, power rectifier 365 is implemented with one or more diodes for rectification while power converter 370 is implemented as a direct current (DC) to DC buck converter. Other power harvesting circuitry components may be used. Power harvesting circuitry 310 is used to charge energy storage unit 315. In one embodiment, energy storage unit 315 is implemented with a capacitor, such as a supercapacitor. In yet other embodiments, a rechargeable battery may be implemented, though such implementations may have a shorter life span, and thus requiring periodic surgical replacement. Alternatively, energy storage unit 315 may be implanted into another region of eye 175 (e.g., under the sclera) and tethered to enclosure 301. Placing a battery within the sclera may provide for less invasive replacement procedures. However, the components are all implanted into eye 175, and thus less susceptible to infection compared to a transcutaneous tether extending external to the eye.

Clock recovery circuitry 320 is also coupled to power antenna 305 to extract and recover a synchronous clock signal from power signal 131 from auxiliary head unit 200. Accordingly, clock recovery circuitry 320 operates to recover the lower frequency f1 from the carrier wave of power signal 131. Frequency f1 (or a partial/whole multiple thereof) is then provided to the other circuit components of IOMD implant 300 for synchronous timing. In particular, PLL 325 may be used to lock onto the phase of the synchronous clock output from clock recovery 320 and an upconverted frequency f2 provided to receiver circuitry 350 to synchronously demodulate data signal 136 received from auxiliary head unit 200 over data antenna 345. Receiver circuitry 350 includes LNA 375 to amplify data signal 136 and demodulator 380 to down convert and decode the higher frequency f2 data signal 136. Demodulator 380 may be implemented using a variety of decoding circuits, such as, an energy detect circuit, an IQ receiver, or otherwise. Data signals 136 may be modulated using one or more of frequency modulation, phase modulation, amplitude modulation, quadrature modulation, etc.

The decoded data signals 136 are then provided to display controller 355 as the image data to be displayed by micro-display 360. Display controller 355 may be a discrete controller from IOMD controller 330 (e.g., integrated into micro-display 360) or may be logic functions/instructions executed on IOMD controller 330 for the purpose of controlling operation of micro-display 360. In one embodiment, micro-display 360 is implemented as a multi-color light emitting diode (LED) display array. In other embodiments, micro-display 360 is a backlit liquid crystal display (LCD), a monochrome LED display array, an organic LED (OLED) display, or otherwise. In one embodiment, micro-display 360 has 5 mm diameter display while enclosure 301 has an overall 10 mm×10 mm size. Micro-display 360 outputs the image based upon the received image data, which is projected through focusing optics 165 onto retina 170.

IOMD implant 300 also includes IOMD controller 330, which serves to orchestrate the operation of the other functional components of IOMD implant 300. As with auxiliary controller 220, IOMD controller 330 may be implemented in hardware logic, implemented in software/firmware logic stored to a machine readable medium and executed by a microcontroller, or implemented in a combination of both.

In the illustrated embodiment, IOMD controller 330 is coupled to receive sensor readings from one or more sensors 335. Sensor(s) 335 may include a temperature sensor to monitor the operational temperature of IOMD implant 300. In this regard, the temperature sensor is a proxy reading for power consumption or power dissipation within IOMD implant 300. The temperature sensor also serves as a safety measure to ensure the eye tissue surrounding IOMD implant 300 is not damaged due to elevated operational temperatures.

In one embodiment, sensors 335 also include a voltage sensor coupled to energy storage unit 315 to measure and monitor the voltage across the electrodes of energy storage unit 315, and thus measure the stored energy. The measured voltage across energy storage unit 315 may also serve as a proxy for, or an indication of, the reception strength of power signal 131. Alternatively, sensors 335 may be coupled to power harvesting circuitry 310 and/or power antenna 305 to directly measure received voltage.

IOMD controller 330 further includes logic for generating the ACK signal, which is transmitted back to the auxiliary head unit 200 via transmit module 340 as a feedback data path. Auxiliary head unit 200 uses the ACK signal to manage overall system power consumption by adjusting frame rates, color fading, and transmit power. The ACK signal may operate as an acknowledgment of each received image frame, an indication that the data frame was correctly received and displayed, an indication of the operating temperature of IOMD implant 300, and an indication of reception strength (or a proxy thereof, such as voltage level on energy storage unit 315).

FIG. 3 illustrates two options for implementing the feedback data path. Option (1) illustrates transmit module 340 coupled to power antenna 305 to provide the feedback data path over the lower frequency f1 wireless power charging path. With option (1), transmit module 340 operates as an RFID tag to modulate the impedance of power antenna 305 and generate ACK signal 250 as a backscatter modulation of power signal 131. Option (2) illustrates transmit module 340 coupled to data antenna 345 to provide the feedback data path over the high frequency f2 wireless data signal path. With option (2), transmit module 340 is an active transmitter for generating ACK signal 250. Of course, options (1) and (2) need not be mutually exclusive, but rather, in some embodiments, both options may be implemented and used selectively based upon available power budget and bandwidth needs for the feedback data path.

In one embodiment, power antenna 305 is shaped as a loop antenna to harvest radio frequency or microwave frequency wireless power. However, it should be appreciated that power antenna 305 may assume a variety of sizes and shapes to harvest power from various frequencies of electromagnetic (EM) radiation. Similarly, data antenna 345 may assume a variety of different sizes and shapes to effectively receive (and optionally transmit) data signals 136 and/or ACK signal 250 at the higher frequency f2 (e.g., 2.4 GHz or otherwise). For example, data antenna 345 may be a dipole antenna, a patch antenna, or otherwise. In one embodiment, data antenna 345 is an optical antenna (e.g., photo receiver or photo transceiver) and data signals 136 are optical wavelength EM radiation. In yet another embodiment, power antenna 305 and data antenna 345 may be implemented as a single physical antenna that is shared between power harvesting circuitry 310, receiver circuitry 350, and transmit module 340. In this shared embodiment, power antenna 305 and data antenna 345 are graphical representations of the different functional uses for a single physical antenna.

Finally, FIG. 3 illustrates optics 165, which provide the optical power for focusing the regenerated image 361 output from micro-display 360 onto retinal 170. As discussed above, optics 165 include a high-power base lens (e.g., 100 diopters or more) along with one or more adjustable components. These adjustable components include an adjustable power lens that provides an adjustable focal distance (z-axis adjustment) to regenerated image 361. In various embodiments, optics 165 further include one or more adjustable prisms that provide beam steering for lateral adjustments (x and/or y axis adjustment) of the position of the projected image 362. Lateral adjustments ensure that projected image 362 is properly positioned/centered on retina 170 including the user's fovea. Regenerated image 361 and/or projected image 362 may be referred to herein as the image, the regenerated image, or the projected image, but all refer to the image output from micro-display 360 whether or not it has been lensed or beam steered by optics 165.

Figure 4A:
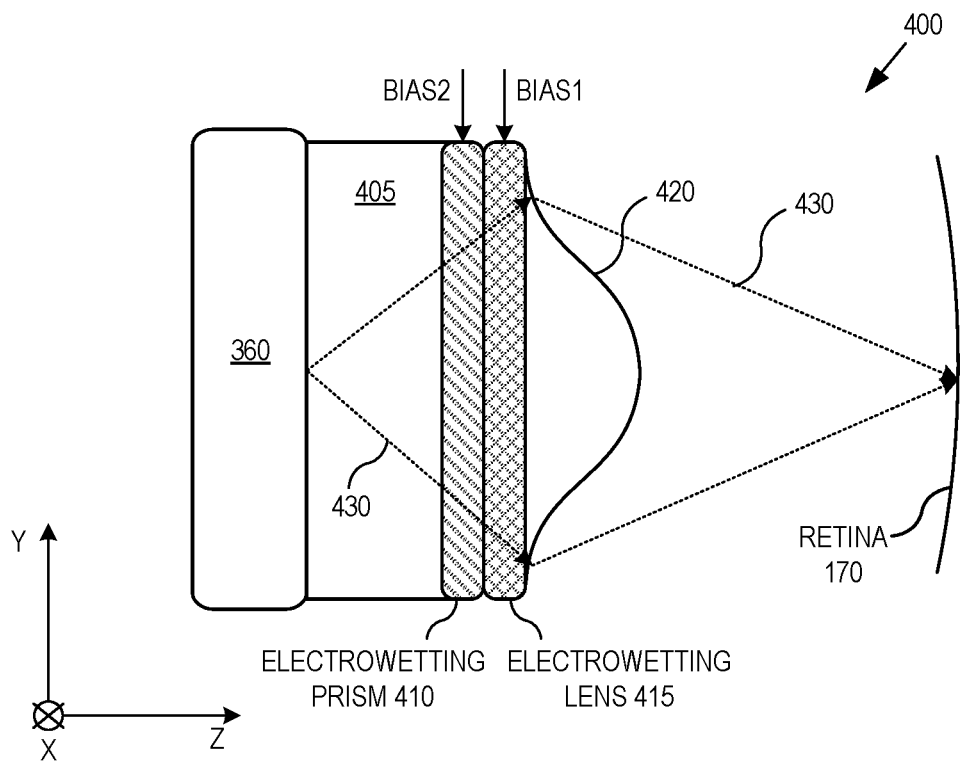
FIGS. 4A & 4B illustrate components of the optical system of the IOMD implant, in accordance with an embodiment of the disclosure.
Figure 4B:
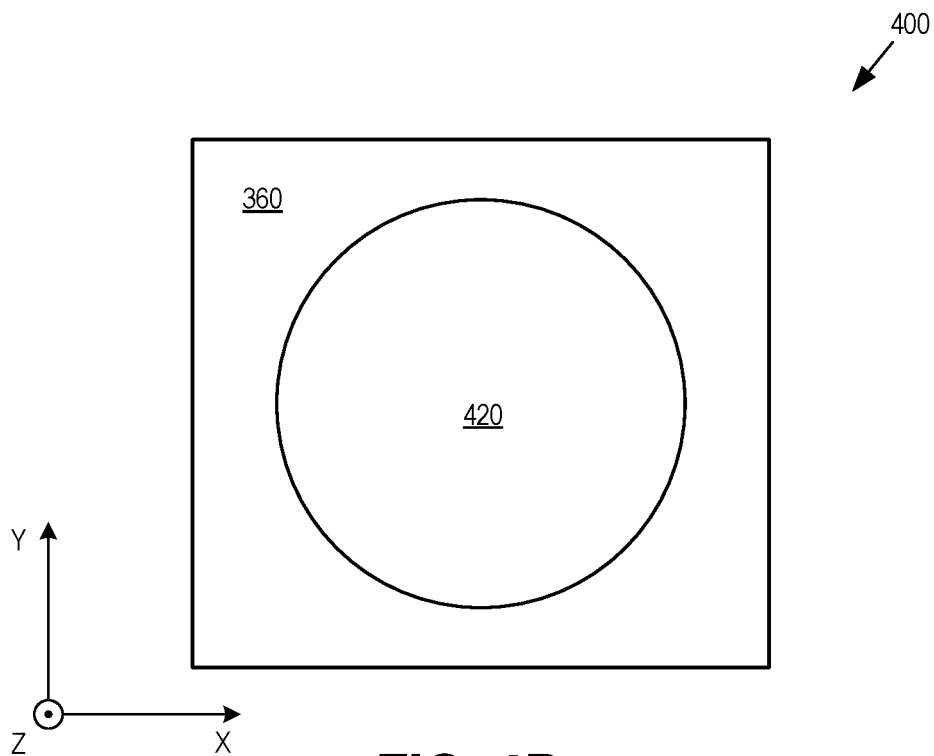

FIGS. 4A & 4B illustrate components of an optical system 400, in accordance with an embodiment of the disclosure. Optical system 400 represents a possible implementation of the combination of micro-display 360 and optical system 165 illustrated in FIG. 3. FIG. 4A is a cross-sectional illustration of optical system 400 while FIG. 4B is a front view illustration as seen from retina 170. The illustrated embodiment of optical system 400 includes micro-display 360, standoff housing 405, electrowetting prism 410, electrowetting lens 415, and base lens 420. Although FIG. 4A illustrates optical system 400 as implemented using an electrowetting prism and an electrowetting lens, it should be appreciated that these components may be implemented with other electrically manipulated adjustable prisms or adjustable lenses, such as liquid crystal devices.

IOMD controller 330 (and/or display controller 355) are electronically coupled to optical system 165 (e.g., electrowetting prism 410 and/or electrowetting lens 415) to manipulating the optical power and/or beam steering direction of those components. This electrical manipulation is adjustable in-situ after IOMD implant 300 has been surgically implanted into a patient's eye. Electrical manipulation of the electrowetting lens 415 (via depth-offset bias signal BIAS1) facilitates adjustment of the overall focal distance (z-axis) of optical system 165 to bring image 362 into focus at the user's retina 170. In one embodiment, electrowetting lens 415 is capable of plus or minus 5 diopters of adjustment; however, other embodiments may be capable of other amounts of adjustment. Similarly, electrical manipulation of electrowetting prims 410 (via signal BIAS2) facilitates lateral adjustment of the position (x-axis and/or y-axis) of image 362 projected onto retina 170. Electrowetting prism 410 (or other adjustable prisms) provide adjustable refraction in one or two axes for light bending, also referred to as beam steering. These post-surgical adjustments relax the surgical margin of error for the surgeon thereby increasing the success rate of the surgical implantation.

As mentioned above, bias signals BIAS1 and BIAS2 are adjustable in-situ after implantation of IOMD implant 300. In one embodiment, bias signals BIAS1 and BIAS2 are wirelessly communicated to IOMD implant 300 from auxiliary head unit 200. For example, depth-offset bias signal BIAS1 may be generated in response to IOMD controller 330 receiving a depth-offset control signal from auxiliary head unit 200 included within data signals 136. Similarly, beam steering bias signal(s) BIAS2 may be generated by IOMD controller 330 in response to beam steering control signals wirelessly communicated from auxiliary head unit 200 within data signals 136. These control signals may constitute configuration signals used to program non-volatile registers, which may be subsequently reprogrammed if desired, or may be values that are programmed into auxiliary head unit 200 and retransmitted each time IOMD implant 300 receives an image.

In the illustrated embodiment, base lens 420 is positioned in the optical path 430 of image 362 extending between micro-display 360 and retina 170. Base lens 420 provides significantly higher optical power than electrowetting lens 415 to bring the image 362 into focus on retina 170 given the relative short throw distance. In one embodiment, base lens 420 provides approximately 100 diopters of power. Base lens 420 is a fixed optical power lens and may be implemented using a variety of lensing technologies, such as a traditional refractive lens, a Fresnel lens, a diffractive lens, a fixed liquid crystal lens, a nanophotonic lens including nanopillars, or combinations thereof.

Standoff housing 405 is provided between base lens 420 and micro-display 360 to provide adequate physical separation between the two optical elements to allow image path 430 to adequately expand prior to incidence upon base lens 420. In one embodiment, standoff housing 405 is a housing that defines a cavity that seals a gas in optical path 430. For example, the gas may be air, an inert gas, or otherwise. Preferably, the gas sealed in optical path 430 by standoff housing 405 has a refractive index close to unity so as to maximize the optical power of base lens 420 and the adjustable optical components. Although FIG. 4A illustrates the adjustable optical components (electrowetting prism 410 and electrowetting lens 415) as disposed between standoff housing 405 and base lens 420, they may also be disposed between standoff housing 405 and micro-display 360. Similarly, the order of electrowetting prism 410 and electrowetting lens 415 in the optical path 430 may be flipped from what is illustrated.

Figure 5A:
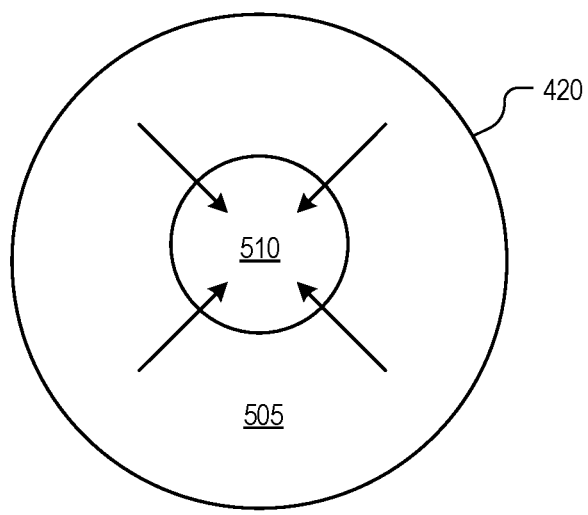
FIG. 5A illustrates how the base lens is configured to transfer optical resolution from the periphery to the center of the lens, in accordance with an embodiment of the disclosure.
Figure 5B:
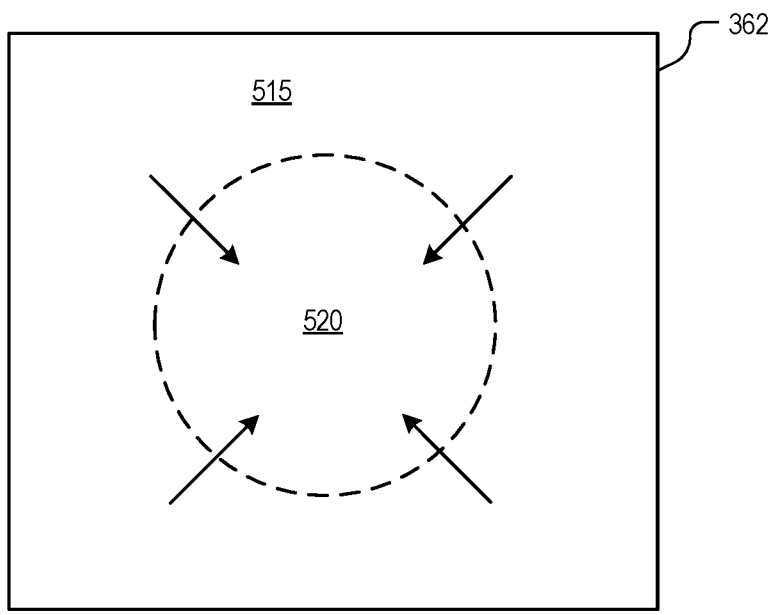
FIG. 5B illustrates how the image may be pre-distorted to leverage the higher resolution in the center region of the base lens, in accordance with an embodiment of the disclosure.

As is well known, human acuity is highest in the small central cone of vision (e.g., central 5 degree cone of vision) referred to as the foveal vision. Foveal vision corresponds to the higher density of receptors in the fovea portion of the retina. In one embodiment, this high acuity region is leveraged by adjusting the shape of base lens 420 to transfer optical resolution from a periphery of micro-display 360 to a center of micro-display 360. This provides greater resolution in image 362 projected on the user's foveal vision region of retina 170 relative to the image portion projected onto a peripheral vision region of retina 170. FIGS. 5A and 5B illustrate this feature. In particular, FIG. 5A illustrates how base lens 420 is configured to transfer optical resolution from peripheral region 505 to a central region 510. This configuration may be achieved via appropriate profile curvature of base lens 420, in the case of a traditional refractive lens. For other types of lenses (e.g., diffractive), a transfer function of the lens is adjusted to achieve the selected resolution transfer, as is known in the art of lens design. By transferring resolution from peripheral region 505 to central region 510, image 361 output from micro-display 360 is pre-distorted to leverage the resolution transfer. FIG. 5B illustrates how image 361 may be pre-distorted to compensate for the distortion induced by the peripheral resolution transfer of base lens 420, in accordance with an embodiment of the disclosure. In other words, a greater portion of the pixels in image 361 output from micro-display 360 is dedicated to the foveal vision portion of image 361 than the actual area of the user's foveal vision. Base lens 420 then compresses this larger area of image 361 into the user foveal vision in the image 362 projected onto retina 170. The end result is image 362 has lower resolution in peripheral region 515 of image 362 than central foveal vision region 520.

Figure 6A:
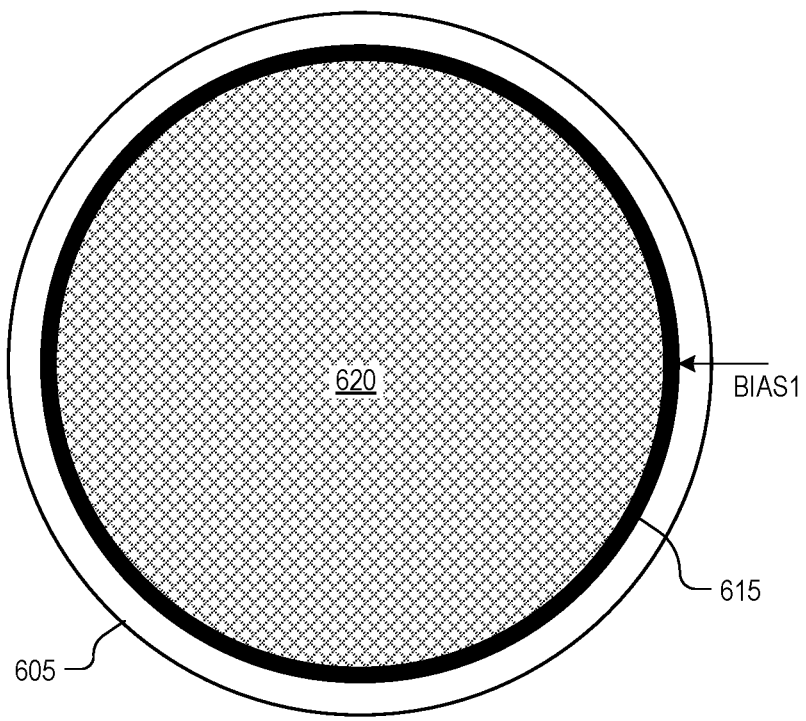
FIGS. 6A & 6B illustrate plan and cross-sectional views of an electrowetting lens, in accordance with an embodiment of the disclosure.
Figure 6B:
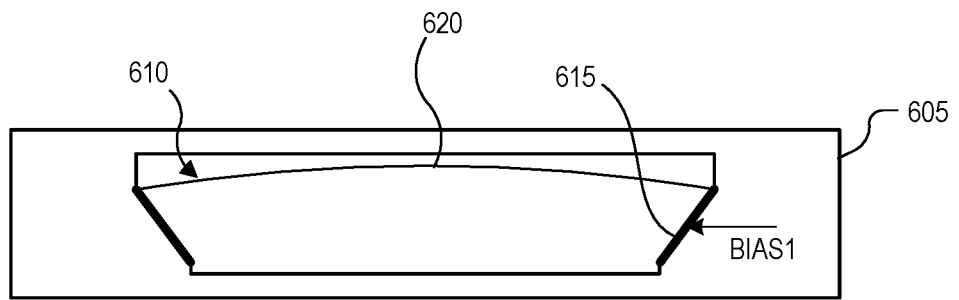

FIGS. 6A & 6B are demonstrative illustrations of an electrowetting lens 600, in accordance with an embodiment of the disclosure. FIG. 6A is a plan view of electrowetting lens 600 while FIG. 6B is a sideview illustration of the same. Electrowetting lens 600 is one possible implementation of electrowetting lens 415 illustrated in FIG. 4A. The illustrated embodiment of electrowetting lens 600 includes a housing 605 defining a cavity 610, a ring electrode 615, and a meniscus 620 formed from the interface of two immiscible fluids (e.g., oil and saline) having differing refractive indexes. The application of a potential to ring electrode 615 via depth-offset bias signal BIAS1 selectively alters the shape of meniscus 620, which in turn adjusts the optical power of electrowetting lens 600.

Figure 7A:
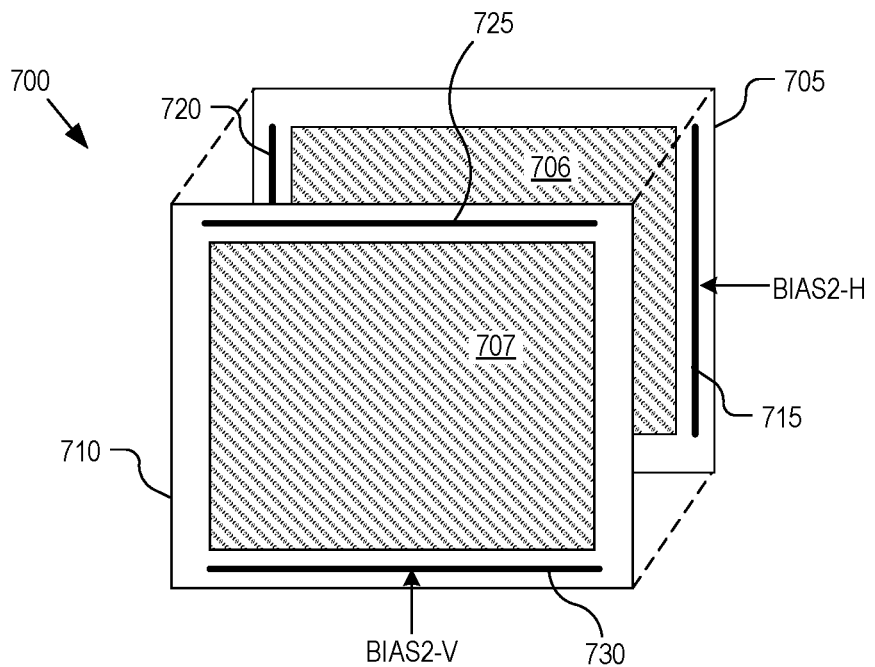
FIG. 7A illustrates two stacked one-dimensional electrowetting prisms, in accordance with an embodiment of the disclosure.
Figure 7B:
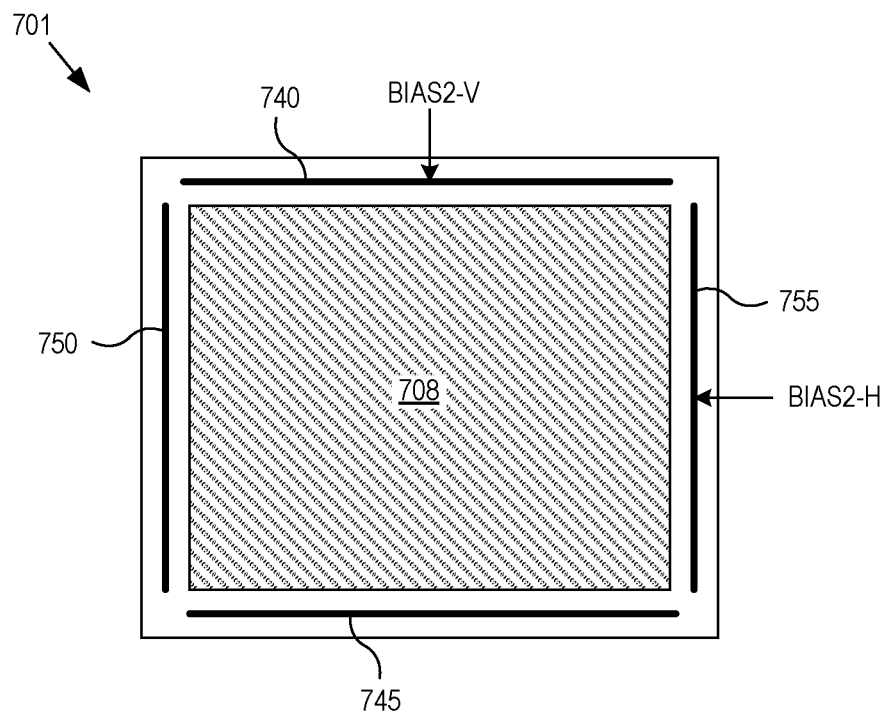
FIG. 7B illustrates a single two-dimensional electrowetting prism, in accordance with an embodiment of the disclosure.

FIGS. 7A and 7B illustrate example implementations of electrowetting prism 410, in accordance with embodiments of the disclosure. FIG. 7A illustrates an electrowetting prism 700 that includes two orthogonally stacked one-dimensional (1D) electrowetting prisms 705 and 710, which collectively provide two orthogonal directions (horizontal and vertical) for beam steering image 362 projected onto retina 170. 1D electrowetting prism 705 provides horizontal beam steering via application of a bias signal BIAS2-H across electrodes 715 and 720, which adjusts the refractive geometry of the meniscus 706 formed by the interface of two immiscible fluids. Similarly, 1D electrowetting prism 710 provides vertical beam steering via application of a bias signal BIAS2-V across electrode 725 and 730, which adjusts the refractive geometry of the meniscus 707 formed by the interface of two immiscible fluids.

FIG. 7B illustrates a single two-dimensional (2D) electrowetting prism 701, in accordance with an embodiment of the disclosure. 2D electrowetting prism 701 operates in a similar manner as electrowetting prism 700, but includes four electrodes 740, 745, 750, and 755 surrounding four sides of a single meniscus 708 formed by the interface of two immiscible fluids.

Figure 8:
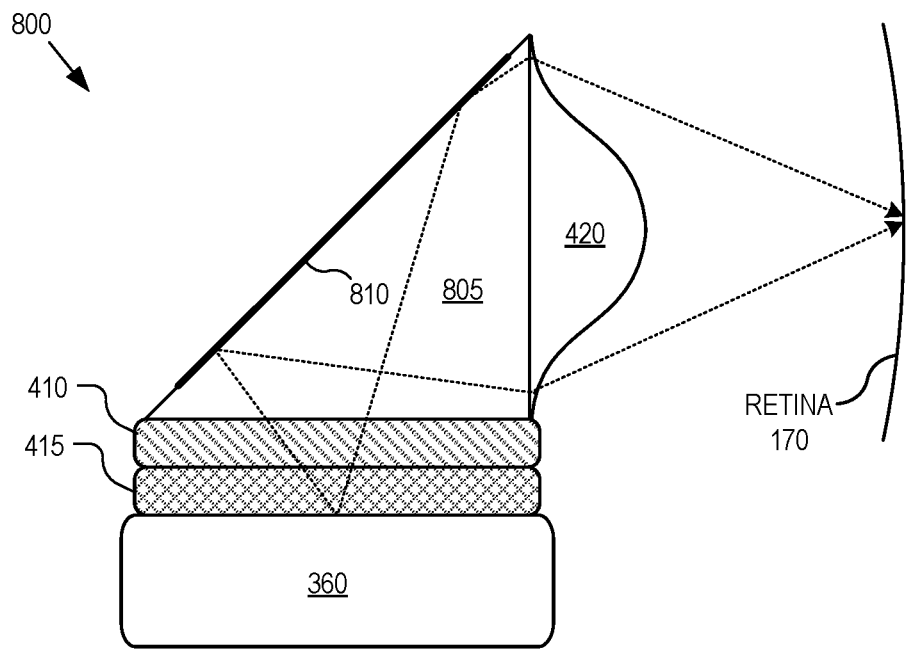
FIG. 8 illustrates an optical system of the IOMD implant that includes a folding mirror, in accordance with an embodiment of the disclosure.

FIG. 8 illustrates an optical system 800 for IOMD implant 300 that includes a folding mirror, in accordance with an embodiment of the disclosure. Optical system 800 represents another possible implementation of optical system 165 illustrated in FIG. 3. The illustrated embodiment of optical system 800 includes a standoff housing 805 having a triangular shape and includes a folding mirror 810 for redirecting image light output from micro-display 360. Base lens 420 and the adjustable optical elements (electrowetting lens 415 and electrowetting prism 410) are disposed on adjacent sides of the triangular shape of standoff housing 805 while folding mirror 810 is disposed along the intervening side (e.g., hypotenuse side). Standoff housing 805 also serves to extend the separation distance between micro-display 360 and base lens 420 while allowing micro-display 360 to be orthogonally oriented relative to that of optical system 400 when IOMD implant 300 is implanted into an eye. Although electrowetting lens 415 and electrowetting prism 410 are illustrated as disposed in the optical path between micro-display 360 and standoff housing 805, they may also be disposed between base lens 420 and standoff housing 805.

Figure 9:
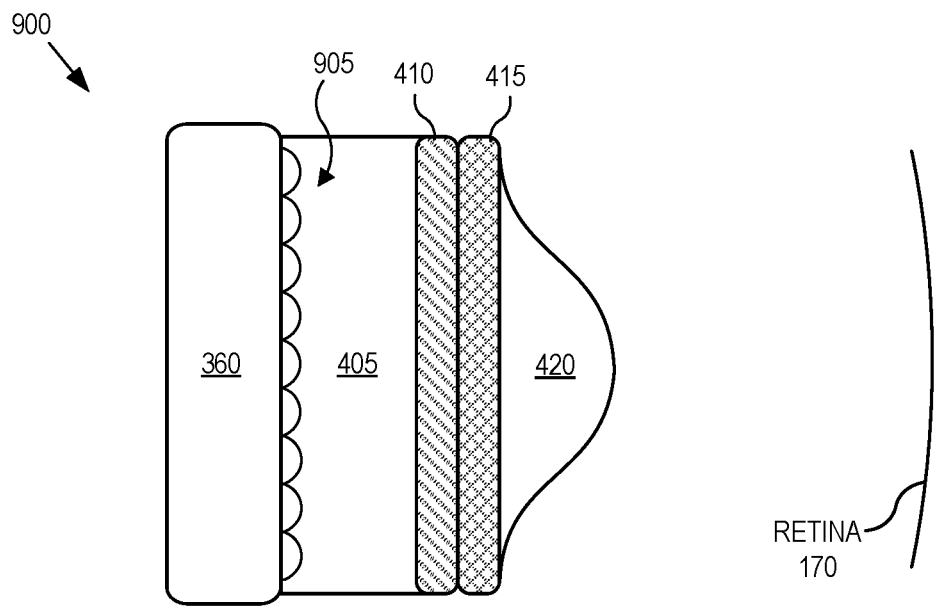
FIG. 9 illustrates an optical system of the IOMD implant that includes an array of micro-lenses, in accordance with an embodiment of the disclosure.

FIG. 9 illustrates an optical system 900 of IOMD implant 300 that includes an array of micro-lenses 905, in accordance with an embodiment of the disclosure. Optical system 900 is another possible implementation of optical system 165. Optical system 900 is similar to optical system 400, except that standoff housing 405 includes the array of micro-lenses 905 disposed across the optical path of the image light output from micro-display 360. Micro-lenses 905 apply optical power to the image 361 output from micro-display 360 to reduce a numeric aperture of the display pixels within micro-display 360. In other words, micro-lenses 905 are aligned with micro-display 360 to reduce the angle of divergence of the light emitted from each pixel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An intraocular micro-display (IOMD) implant, comprising:
    an enclosure shaped for implantation into an eye;
    a micro-display disposed in the enclosure and oriented to emit an image towards a retina of the eye when the IOMD implant is implanted into the eye;
    a base lens having a fixed optical power attached to the enclosure and positioned relative to the micro-display to reside in an optical path extending between the micro-display and the retina when the IOMD implant is implanted into the eye, the base lens configured to apply the fixed optical power to the image; and
    an adjustable lens disposed in the optical path between the micro-display and the retina, the adjustable lens comprising:
        an electrode configured to activate as a result of the IOMD implant receiving a signal from a head-mounted device, the signal configured to cause the IOMD implant to adjust a potential of the electrode; and
        a lens portion having an optical power, the optical power being adjustable based on the potential of the electrode and being adjustable in-situ to adjust a focal distance of the image projected by the IOMD implant after the IOMD implant has been implanted into the eye.

2. The IOMD implant of claim 1, wherein the adjustable lens comprises an electrowetting lens that is disposed in the optical path between the micro-display and the base lens.

3. The IOMD implant of claim 2, further comprising:
    a controller disposed within the enclosure and coupled to the electrowetting lens, the controller including logic that when executed by the controller causes the IOMD implant to perform operations including:
        receiving a depth-offset control signal wirelessly communicated to the IOMD implant; and
        adjusting a depth-offset bias signal applied to the electrowetting lens based on and in response to the depth-offset control signal, wherein the depth-offset bias signal adjusts the focal distance of the image projected from the IOMD implant onto the retina.

4. The IOMD implant of claim 1, further comprising:
    a standoff housing disposed between the micro-display and the base lens to extend a length of the optical path between the micro-display and the base lens, wherein the standoff housing defines a cavity that seals a gas in the optical path.

5. The IOMD implant of claim 4, wherein the standoff housing has a triangular shape, the IOMD implant further comprising:
    a folding mirror disposed in the optical path between the base lens and the micro-display, wherein the base lens and the micro-display are oriented along adjacent sides of the triangular shape while the folding mirror is oriented along an intervening side of the triangular shape extending between the adjacent sides.

6. The IOMD implant of claim 4, further comprising:
an array of microlenses disposed within the standoff housing and extending across the optical path to apply optical power to the image,
wherein the array of microlenses are configured to reduce a numeric aperture of display pixels within the micro-display.

7. The IOMD implant of claim 1, wherein the base lens is configured to transfer optical resolution from a periphery of the micro-display to a center of the micro-display to provide greater resolution in a first portion of the image projected onto a foveal vision region of the retina relative to a second portion of the image projected onto a peripheral vision region of the retina.

8. An intraocular micro-display (IOMD) implant, comprising:
an enclosure shaped for implantation into an eye;
a micro-display disposed in the enclosure and oriented to emit an image towards a retina of the eye when the IOMD implant is implanted into the eye;
a base lens having a fixed optical power attached to the enclosure and positioned relative to the micro-display to reside in an optical path extending between the micro-display and the retina when the IOMD implant is implanted into the eye, the base lens configured to apply the fixed optical power to the image;
an adjustable lens disposed in the optical path between the micro-display and the retina, the adjustable lens having an adjustable optical power that is adjustable in-situ to adjust a focal distance of the image projected by the IOMD implant after the IOMD implant has been implanted into the eye; and
an electrowetting prism disposed in the optical path between the micro-display and the retina, the electrowetting prism having an adjustable refractive geometry that is adjustable in-situ to beam steer the image and adjust a lateral position of the image projected onto the retina after the IOMD implant has been implanted into the eye.

9. The IOMD implant of claim 8, wherein the adjustable refractive geometry of the electrowetting prism is adjustable in two orthogonal directions to provide vertical and horizontal beam steering of the image.

10. The IOMD implant of claim 8, wherein the electrowetting prism is disposed between the micro-display and the base lens.

11. The IOMD implant of claim 10, wherein the electrowetting prism and the adjustable lens are sandwiched together between the micro-display and the base lens.

12. An intraocular micro-display (IOMD) system, comprising:
an auxiliary head unit including a camera module to acquire an image and wirelessly relay image data of the image in real-time; and
an intraocular micro-display (IOMD) implant shaped for implantation into an eye, the IOMD implant including:
an antenna configured to receive the image data;
a micro-display configured to output a regenerated image based upon the image data and oriented to project the regenerated image towards a retina of the eye when the IOMD implant is implanted into the eye;
a base lens having a fixed optical power positioned relative to the micro-display to reside in an optical path extending between the micro-display and the retina when the IOMD implant is implanted into the eye, the base lens configured to apply the fixed optical power to the regenerated image;
an electrowetting lens disposed in the optical path between the micro-display and the retina, the electrowetting lens having an adjustable optical power that is adjustable in-situ to adjust a focal distance of the regenerated image projected by the IOMD implant after the IOMD implant has been implanted into the eye; and
an electrowetting prism disposed in the optical path between the micro-display and the retina, the electrowetting prism having an adjustable refractive geometry that is adjustable in-situ to beam steer the regenerated image and adjust a lateral position of the regenerated image projected onto the retina after the IOMD implant has been implanted into the eye.

13. The IOMD system of claim 12, wherein the IOMD implant further comprises:
a controller coupled to the electrowetting lens, the controller including logic that when executed by the controller causes the IOMD implant to perform operations including:
receiving a depth-offset control signal wirelessly communicated to the IOMD implant from the auxiliary head unit; and
adjusting a depth-offset bias signal applied to the electrowetting lens based on and in response to the depth-offset control signal, wherein the depth-offset bias signal adjusts the focal distance of the regenerated image projected from the IOMD implant onto the retina.

14. The IOMD system of claim 12, wherein the adjustable refractive geometry of the electrowetting prism is adjustable in two orthogonal directions to provide vertical and horizontal beam steering of the regenerated image.

15. The IOMD system of claim 12, wherein the electrowetting prism is disposed between the micro-display and the base lens.

16. The IOMD system of claim 12, wherein the IOMD implant further comprises:
a standoff housing disposed between the micro-display and the base lens to extend a length of the optical path between the micro-display and the base lens, wherein the standoff housing defines a cavity that seals a gas in the optical path.

17. The IOMD system of claim 16, wherein the standoff housing has a triangular shape, the IOMD implant further comprising:
a folding mirror disposed in the optical path between the base lens and the micro-display, wherein the base lens and the micro-display are oriented along adjacent sides of the triangular shape while the folding mirror is oriented along an intervening side of the triangular shape extending between the adjacent sides.

18. The IOMD system of claim 12, wherein the base lens is configured to transfer optical resolution from a periphery of the micro-display to a center of the micro-display to provide greater resolution in a first portion of the regenerated image projected onto a foveal vision region of the retina relative to a second portion of the regenerated image projected onto a peripheral vision region of the retina.

19. The IOMD system of claim 12, wherein the electrowetting lens is disposed in the optical path between the micro-display and the base lens.

* * * * *